W. W. POTTS.
Land-Marker.
No. 45,174
Patented Nov. 22, 1864
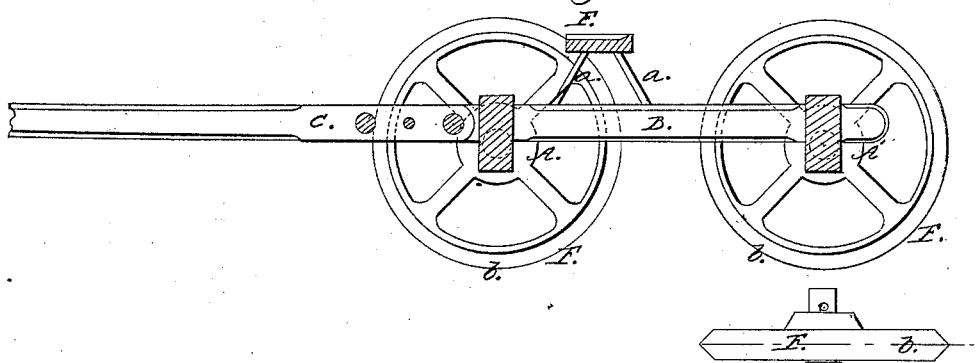
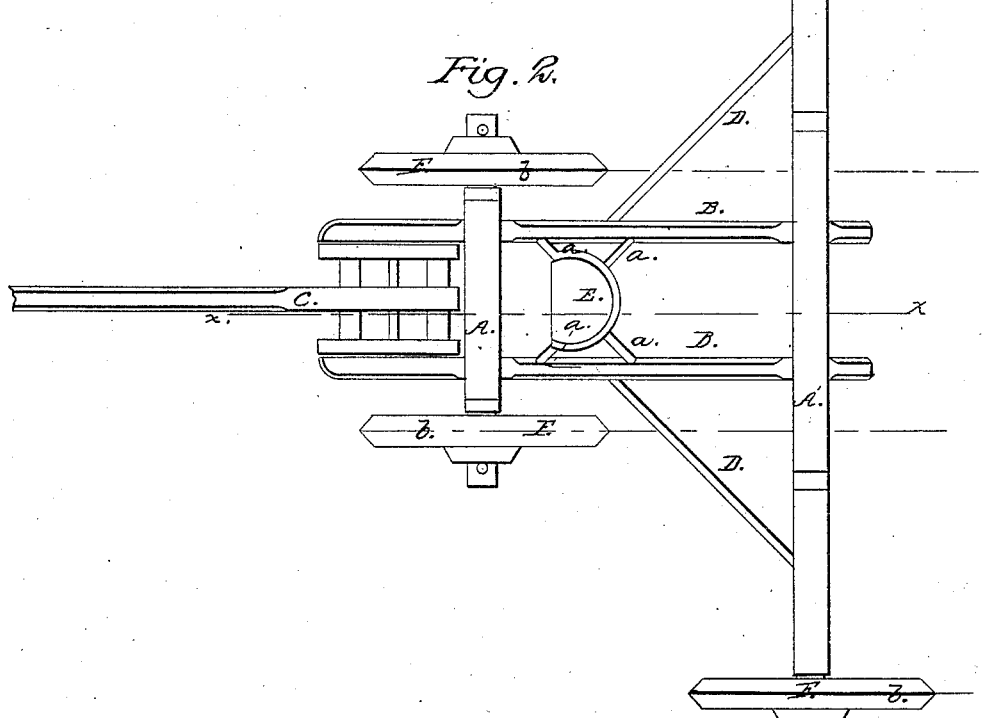
Witnesses:
Inventor:

UNITED STATES PATENT OFFICE.

W. W. POTTS, OF RUSHVILLE, ILLINOIS.

DEVICE FOR MARKING GROUND FOR PLANTING.

Specification forming part of Letters Patent No. 45,174, dated November 22, 1864.

*To all whom it may concern:*

Be it known that I, W. W. POTTS, of Rushville, in the county of Schuyler and State of Illinois, have invented a new and Improved Furrowing Device; and I do hereby declare that the following is a full, clear, and exact description thereof, which will enable others skilled in the art to make and use the same, reference being had to the accompanying drawings, forming part of this specification, in which—

Figure 1 represents a side sectional view of my invention, taken in the line $x\,x$, Fig. 2; Fig. 2, a plan or top view of the same.

Similar letters of reference indicate like parts.

This invention relates to a new and improved machine for furrowing ground for planting corn; and it consists in the employment or use of wheels provided with beveled rims and attached to axles, all being arranged as hereinafter fully shown and described, whereby ground may be furrowed in a rapid manner and with great accuracy, so as to insure the corn being planted in check-rows.

A A' represent two axles, which are parallel with each other and connected by two reaches, B B, the front ends of which project beyond the front axle, A, and serve as hounds to receive the back end of the draft-pole C. The front axle, A, is just two-thirds longer than the back axle, A', and the latter is braced from the reaches B B by rods D D, as shown clearly in Fig 2. The centers of the two axles are in line with each other.

E represents the driver's seat, which is placed on or attached to the reaches B B, being supported by rods $a$.

F represents the wheels of the machine, the rims or fellies of which are beveled, as shown at $b$, to form a V-shaped or outer surface. (See more particularly Fig. 2.) In consequence of the front axle, A, being just one-third the length of the back axle, A', and the wheels F placed on the ends of the axles, the wheels, as the device is drawn along, will mark the earth with four furrows at equal distances apart. The bevel form of the rims of the wheels causes the latter to penetrate the earth freely and mark the same with distinct furrows. I design to have the furrows about three and a half feet apart. By this arrangement I obtain a very simple and efficient device for furrowing— one which may be very readily managed, so as to make perfectly straight furrows at equal distances and insure the corn being planted in check-rows.

I claim as new and desire to secure by Letters Patent—

1. The long and short axles A A', in combination with the wheels F, provided with beveled rims $b$, all arranged substantially as and for the purpose specified.

2. The connecting of the axles A A' by means of the two parallel reaches B B, extending beyond the front axle, A, to form hounds to receive the draft-pole C, in connection with the brace-rods D D, all arranged, as shown, to form a simple, economical, and durable framing for a device for the purpose set forth.

W. W. POTTS.

Witnesses:
  G. W. SCRIPPS,
  WM. McCREERY.